United States Patent
Fish

(12) United States Patent (10) Patent No.: US 8,461,731 B2
Fish (45) Date of Patent: Jun. 11, 2013

(54) DYNAMOELECTRIC MACHINE PRESSURIZING APPARATUS

(75) Inventor: William Earl Fish, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 13/102,226

(22) Filed: May 6, 2011

(65) Prior Publication Data

US 2012/0280583 A1 Nov. 8, 2012

(51) Int. Cl.
*H02K 9/00* (2006.01)

(52) U.S. Cl.
USPC .......................................................... 310/58

(58) Field of Classification Search
USPC ................................ 310/52, 55, 58, 59, 61–63
See application file for complete search history.

(56) References Cited

U.S. PATENT DOCUMENTS

| | | | |
|---|---|---|---|
| 5,049,770 A * | 9/1991 | Gaeth et al. ...................... | 310/89 |
| 5,081,384 A * | 1/1992 | Rausch ........................... | 310/63 |
| 5,944,497 A * | 8/1999 | Kershaw et al. ........... | 417/423.8 |
| 5,947,040 A | 9/1999 | Gregor | |
| 6,720,685 B2 * | 4/2004 | Balas ............................ | 310/400 |
| 7,771,158 B2 | 8/2010 | Grassi | |
| 2010/0115889 A1 | 5/2010 | Brandes | |

FOREIGN PATENT DOCUMENTS

| | | |
|---|---|---|
| EP | 0921318 A2 | 6/1999 |
| EP | 2182193 A1 | 5/2010 |
| GB | 1415867 A | 11/1975 |
| GB | 2349424 A | 11/2000 |

OTHER PUBLICATIONS

Search Report for corresponding Great Britain Application No. 1207785.5, dated Jan. 3, 2013.

* cited by examiner

*Primary Examiner* — Dang Le
(74) *Attorney, Agent, or Firm* — Ernest G. Cusick; Hoffman Warnick LLC

(57) ABSTRACT

A dynamoelectric machine pressurization apparatus is disclosed. In one embodiment, the apparatus includes a dynamoelectric machine air shield including a channel configured to fluidly connect an outlet of a rotor fan with an ambient air source.

13 Claims, 6 Drawing Sheets

DYNAMOELECTRIC MACHINE PRESSURIZING APPARATUS

BACKGROUND OF THE INVENTION

The subject matter disclosed herein relates to an apparatus for pressurizing a dynamoelectric machine. Specifically, the subject matter disclosed herein relates to an apparatus having a channel fluidly connected to ambient air for pressurizing a dynamoelectric machine.

Pressurizing a dynamoelectric machine, e.g., an electrical generator, may increase the power output of that machine. While prior attempts have been made to pressurize dynamoelectric machines, these approaches may be costly and unreliable. For example, prior approaches have used external compressor-based devices to introduce pressure in dynamoelectric machines. These approaches may cause over-pressurization of the machine, thereby negatively affecting the machine's performance. Additionally, these approaches involve procuring and managing extraneous equipment.

BRIEF DESCRIPTION OF THE INVENTION

A dynamoelectric machine pressurization apparatus is disclosed. In one embodiment, the apparatus includes a dynamoelectric machine air shield including a channel configured to fluidly connect an outlet of a rotor fan with an ambient air source.

A first aspect of the invention includes a dynamoelectric machine air shield including a channel configured to fluidly connect an outlet of a rotor fan with an ambient air source.

A second aspect of the invention includes a dynamoelectric machine comprising: a casing substantially containing: a rotor including a rotor fan; a stator substantially surrounding the rotor and the rotor fan, wherein the rotor and the stator are substantially sealed from an ambient air source by the casing; and an air shield at least partially surrounding the rotor, the air shield including a channel configured to fluidly connect an outlet of the rotor fan with the ambient air source.

A third aspect of the invention includes a system comprising: a turbine; a dynamoelectric machine operably coupled to the turbine, the dynamoelectric machine having: a casing substantially containing: a rotor including a rotor fan; a stator substantially surrounding the rotor and the rotor fan, wherein the rotor and the stator are substantially sealed from an ambient air source by the casing; and an air shield at least partially surrounding the rotor, the air shield including a channel configured to fluidly connect an outlet of the rotor fan with the ambient air source.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
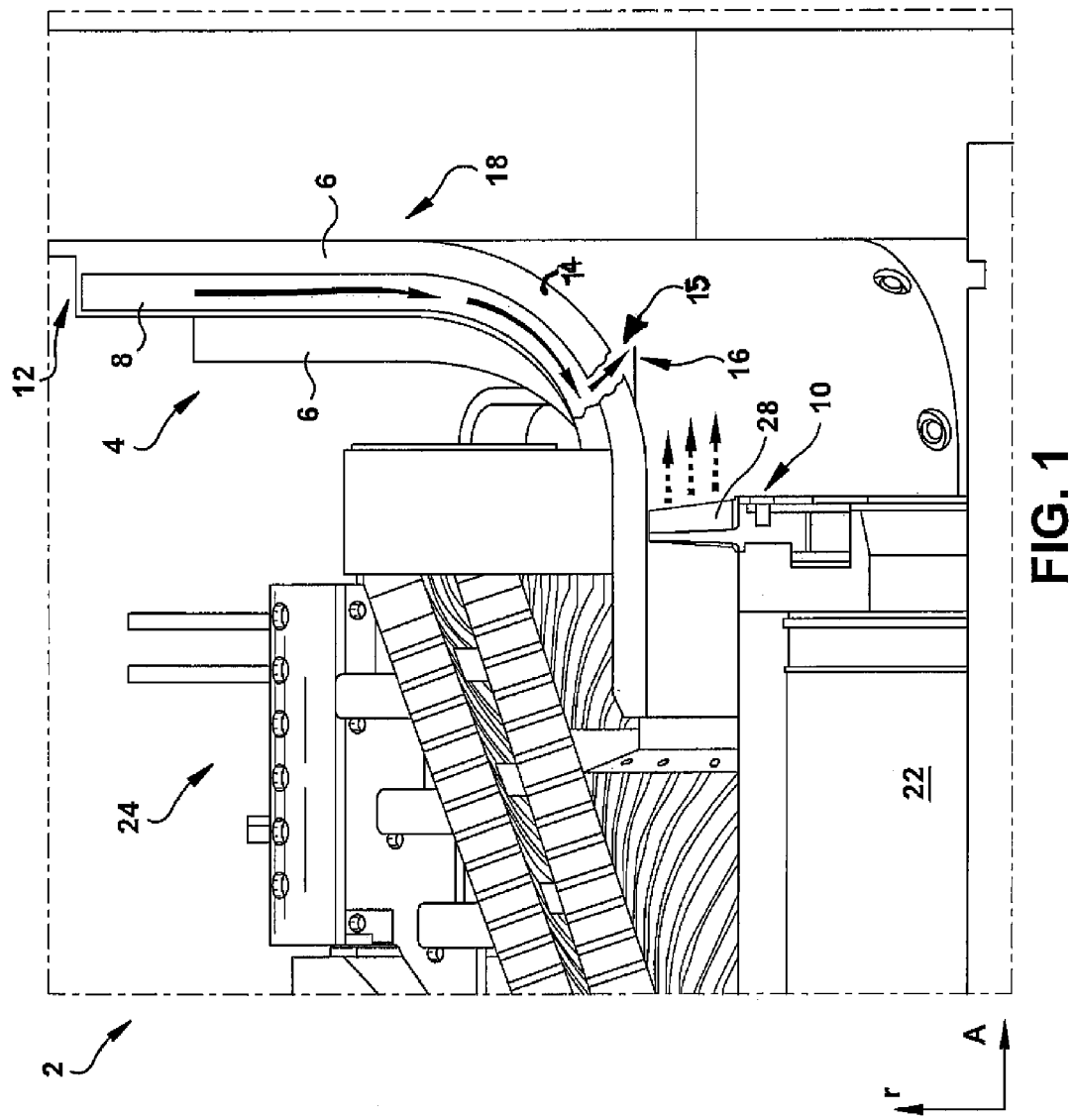
FIG. 1 shows a partial cut-away schematic view of a dynamoelectric machine including a dynamoelectric machine pressurizing apparatus according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention relate to an apparatus for pressurizing a dynamoelectric machine. Specifically, the subject matter disclosed herein relates to an apparatus having a channel fluidly connected to ambient air for pressurizing a dynamoelectric machine.

In contract to conventional approaches, aspects of the invention include an apparatus for pressurizing a dynamoelectric machine (e.g., an electrical generator) that includes orifices (e.g., Venturi-style orifices) connected to atmospheric air external to the electrical generator. This apparatus, when implemented in a dynamoelectric machine, may overcome some of the disadvantages of the conventional pressurization approaches by pressurizing the generator without introducing extraneous moving parts or control systems. It may further prevent over-pressurization of the generator while improving the generator's performance.

Specifically, aspects of the invention include a channel (e.g., a Venturi channel) fluidly connected to an air shield or duct in an air-cooled generator, where the channel allows for pressurization of the air-cooled generator during operation. In principal, where the air-cooled generator is sealed from the atmosphere, implementation of a channel within an air shield or duct that is connected to ambient air provides a natural vacuum, drawing ambient air into the generator and creating pressurization within that generator. Even more specifically, aspects of the invention include a channel having an outlet that at least partially faces away from the outlet of a rotor fan (or circulation fan). That is, the channel outlet may be positioned along an arcuate portion of the air shield (or duct) such that it does not provide aerodynamic resistance to the air exiting the fan (e.g., rotor fan or circulation fan). This allows the airflow originating from the fan (e.g., rotor or circulation fan) to pull a natural vacuum through the channel and into the channel outlet, via the Venturi effect.

In one aspect of the invention, an apparatus for pressurizing a dynamoelectric machine is disclosed including an air shield (or duct) having a channel configured to fluidly connect an outlet of a fan (e.g., a rotor or circulating fan) and an ambient air inlet. In one embodiment, the apparatus includes an air shield having at least one channel fluidly connected to an outlet of the rotor fan, and a manifold fluidly connected to the at least one channel and an ambient air inlet. During operation of a dynamoelectric machine including the air shield (or duct), the natural vacuum created by the rotor fan and its position relative to the channel opening (including the airflow-restricting cover), creates a Venturi effect, causing ambient air to be drawn into the channel (e.g., via the manifold), thereby pressurizing an interior of the dynamoelectric machine.

Turning to FIG. 1, a partial cut-away schematic view of a dynamoelectric machine 2 including a dynamoelectric machine pressurizing apparatus 4 is shown according to embodiments of the invention. In one embodiment, the dynamoelectric machine pressurizing apparatus 4 (and more specifically, stator 24) may include a dynamoelectric machine air shield (or, air shield) 6 including a channel 8 extending therethrough, the channel 8 configured to fluidly connect an outlet of a rotor fan 10 (airflow leaving fan blades 28 indicated by dashed arrows) with an ambient air source 12. As shown, in one embodiment, air shield 6 includes an arcuate portion 14, wherein the channel 8 includes at least one opening 15, and an air foil cover 16 along the arcuate portion 14 of the air shield 6. As will be explained further herein with reference to the remaining Figures, the channel 8 may include a first section extending along the arcuate portion of the air shield, and a second section fluidly connected to the first section, the second section being configured to fluidly connect to the ambient air source 12. As shown, air shield 6 may further include a substantially planar portion 18 (e.g., a substantially non-arcuate portion) extending from the arcuate portion 14 (e.g., where both portions of the air shield are formed as a continuous piece of material). As will be described further herein with reference to the remaining Figures, the second section of the channel 8 may extend along the substantially planar portion 18 of the air shield 12. Also shown in FIG. 1 is the body of a rotor 22, which is housed within a stator 24 (both of which are partially shown in cut-away view). It is understood that as described herein, rotor 22 and stator 24 may be part of an air-cooled dynamoelectric machine (e.g., dynamoelectric machine 2), that is sealed by a casing, except as described herein, from ambient air.

Figure 2:
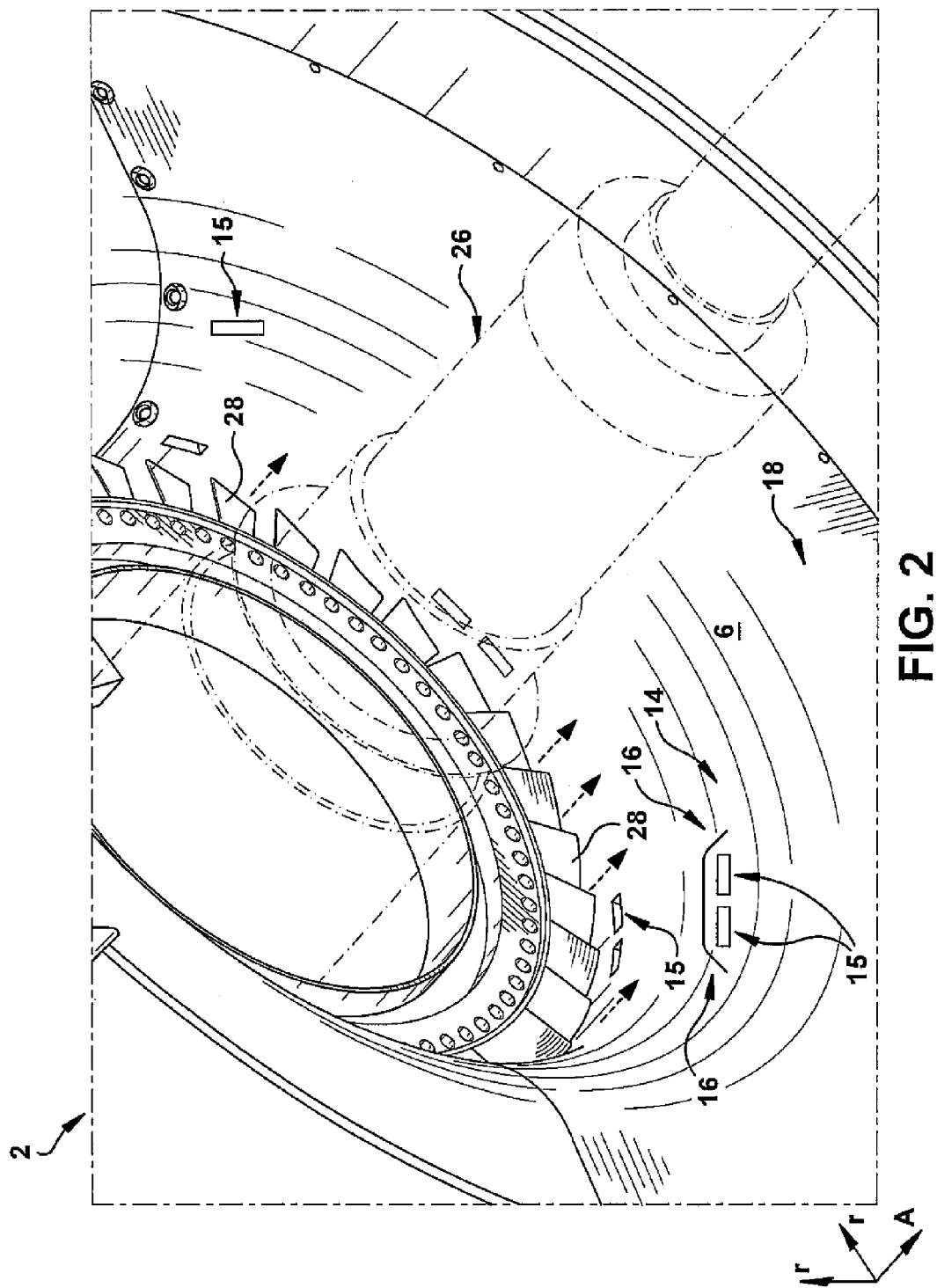
FIG. 2 shows a three-dimensional perspective view of a dynamoelectric machine pressurizing apparatus according to embodiments of the invention.

Turning to FIG. 2, a three-dimensional perspective view of a portion of the dynamoelectric machine 2 is shown according to embodiments of the invention. Included in this three-dimensional perspective view is a depiction of a rotor shaft 26, which is shown as partially transparent. As shown in this view of dynamoelectric machine 2, the air shield 6 includes at least one opening 15 (along with an adjacent air foil cover 16) located along the arcuate portion 14 of air shield 6. These openings 15 may be located proximate to the outlet of the rotor fan 10 (FIG. 1) (or proximate rotor fan blades 28) at a point were the cross sectional area of the air flow is radially increasing, and the air speed is decreasing. This geometric change (e.g., cross-sectional area increase) may be accentuated with the addition of an air foil 16 having a restricting hood that may extend axially over a portion of the opening 15. In some embodiments, openings 15 and air foils 16 may be located axially outward (e.g., axially farther from the center of dynamoelectric machine 2) of the rotor fan 10. This allows the opening 15 to face at least partially away from the outlet of the rotor fan 10, while providing negligible aerodynamic resistance to airflow exiting the fan 10 (via blades 28). The negligible aerodynamic resistance of the opening 15 is accentuated by the position and aerodynamic shape of the air foil 16. In this sense, the airflow exiting the fan 10 (FIG. 1) provides a drawing force across the opening 15 (axially outwardly), such that a partial vacuum is created within opening 15 (and corresponding channel 8, FIG. 1). In other words, the orientation of opening 15 allows the pressure differential created by air flowing over the air foil 16 to draw air inside channel 8 (FIG. 1). The Venturi effect thereby creates a partial vacuum in the channel 8, pulling ambient air from the ambient air source 12, into dynamoelectric machine 2.

Figure 3:
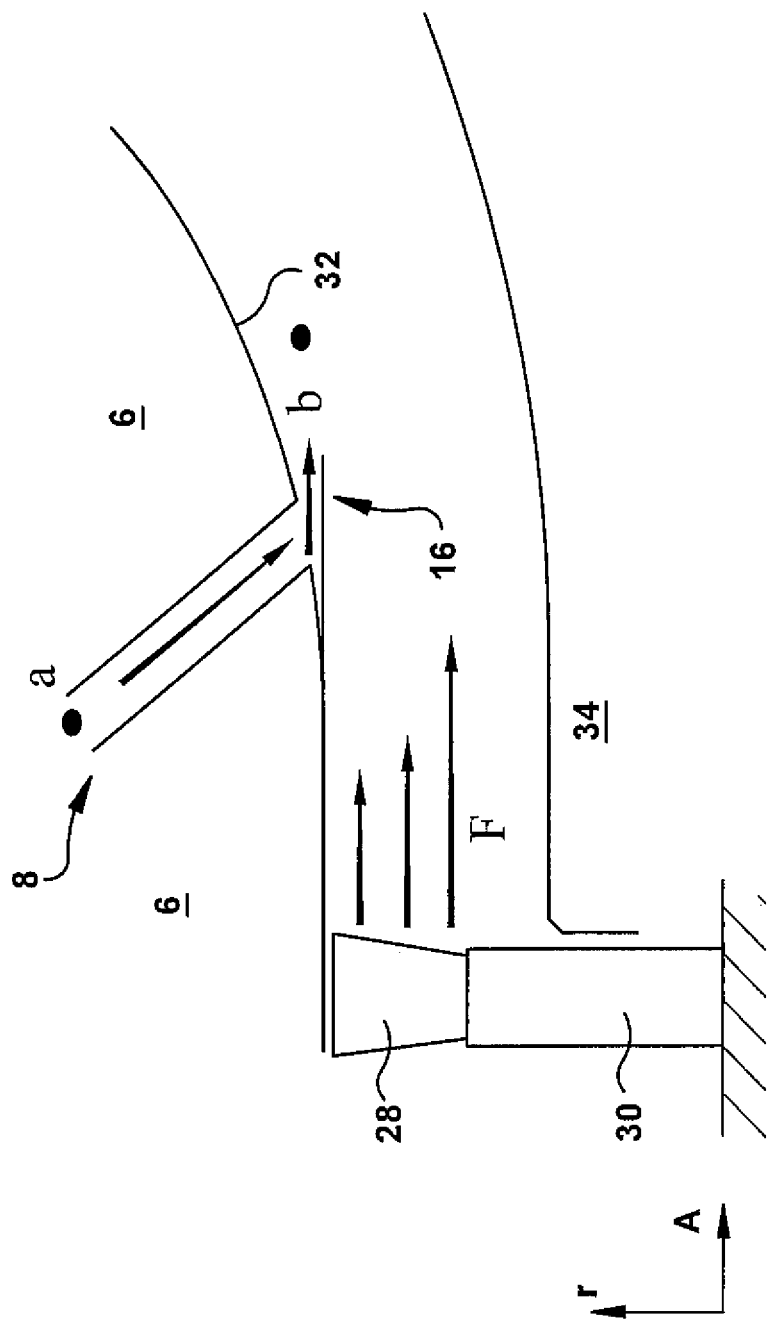
FIG. 3 shows a schematic side view of a portion of a dynamoelectric machine pressurizing apparatus according to embodiments of the invention.

Turning to FIG. 3, a close-up schematic side view of the air shield 6 and a fan blade 28 (connected to a hub 30) of rotor fan 10 (FIG. 1) is shown according to embodiments of the invention. As shown, air flow from fan blade 28 (indicated by arrows and "F" signifying fan airflow) travels axially along a radially inward facing surface 32 of the air shield 6, and also along a radially outward facing surface of a baffle 34 (adjacent the rotor shaft, e.g., rotor shaft 26 of FIG. 2). This airflow F travels along the radially inward facing surface 32 of air shield 6, drawing ambient, or outside, air "a" through the channel 8 and into the opening (labeling omitted for clarity, numbered 15 in FIG. 2).

Aspects of the invention will be further described with respect to the following example, illustrated in the schematic diagram of FIG. 3. In this schematic diagram, two air characteristic indicators "a" and "b" are denoted for explanatory purposes. Prior to actuation of the rotor fan 10 (and movement of fan blades 28), at point "a", air (e.g., ambient air) is substantially at rest, having a velocity approximately equal to zero. The pressure of this ambient air at point "a" may be approximately 1 atmosphere (atm) or 2117 pounds per square foot (psf), as is known in the art. After actuation of the rotor fan 10, and movement of fan blades 28, in one example, the air at point "b" may reach a velocity of approximately 300 feet/second (205 miles per hour). Ignoring any height differences as negligible, and using a simplified Bernoulli's equation (known in the art), the difference in pressure between points "a" and "b" can be illustrated as follows:

$$(Va/2)+(Pa/\rho)=(Vb/2)+(Pb/\rho),$$

where $\rho$ is a constant, and Va is approximately equal to zero.

With Va approximately equal to zero, the simplified version of this equation may read: $(Pa/\rho)=(Vb/2)+(Pb/\rho)$, where $\rho$ is a constant. Using the example of the above-identified Pa=2117 psf and Vb=300 ft/sec, the approximate pressure (Pb) at point "b" would be approximately 1980 psf (or 13.75 pounds-per-square inch). This means the pressure differential between Pa and Pb is approximately equal to: 2117 psf−1980 psf=137 psf. This difference in pressure allows the natural vacuum created at point "b" to draw air from the ambient air source (e.g., ambient air source 12, FIG. 1 and FIG. 5) until its speed (Vb) reduces to the point of equalizing the ambient and internal pressures. That is, while a pressure differential between points "a" and "b" exists, ambient air will be drawn through channel 8 and into opening (e.g., opening 15). Eventually, enough ambient air will enter through the opening to slow the velocity at point "b" and equalize the pressure between points "a" and "b" (see, simplified Bernoulli's equation herein). This creates a limit on the amount of pressure introduced into the interior portion of the dynamoelectric machine, thereby preventing over-pressurization of that machine. In some cases, aspects of the invention may allow for a "natural" pressurization of the dynamoelectric machine of approximately 1-3 psi up until reaching the point of pressure equilibrium.

The calculations described with reference to the example of FIG. 3 are merely used for illustrative purposes, and it is understood that any numeric values may be machine-specific. In some cases, velocities and pressures may differ substantially or trivially from those disclosed herein.

Figure 4:
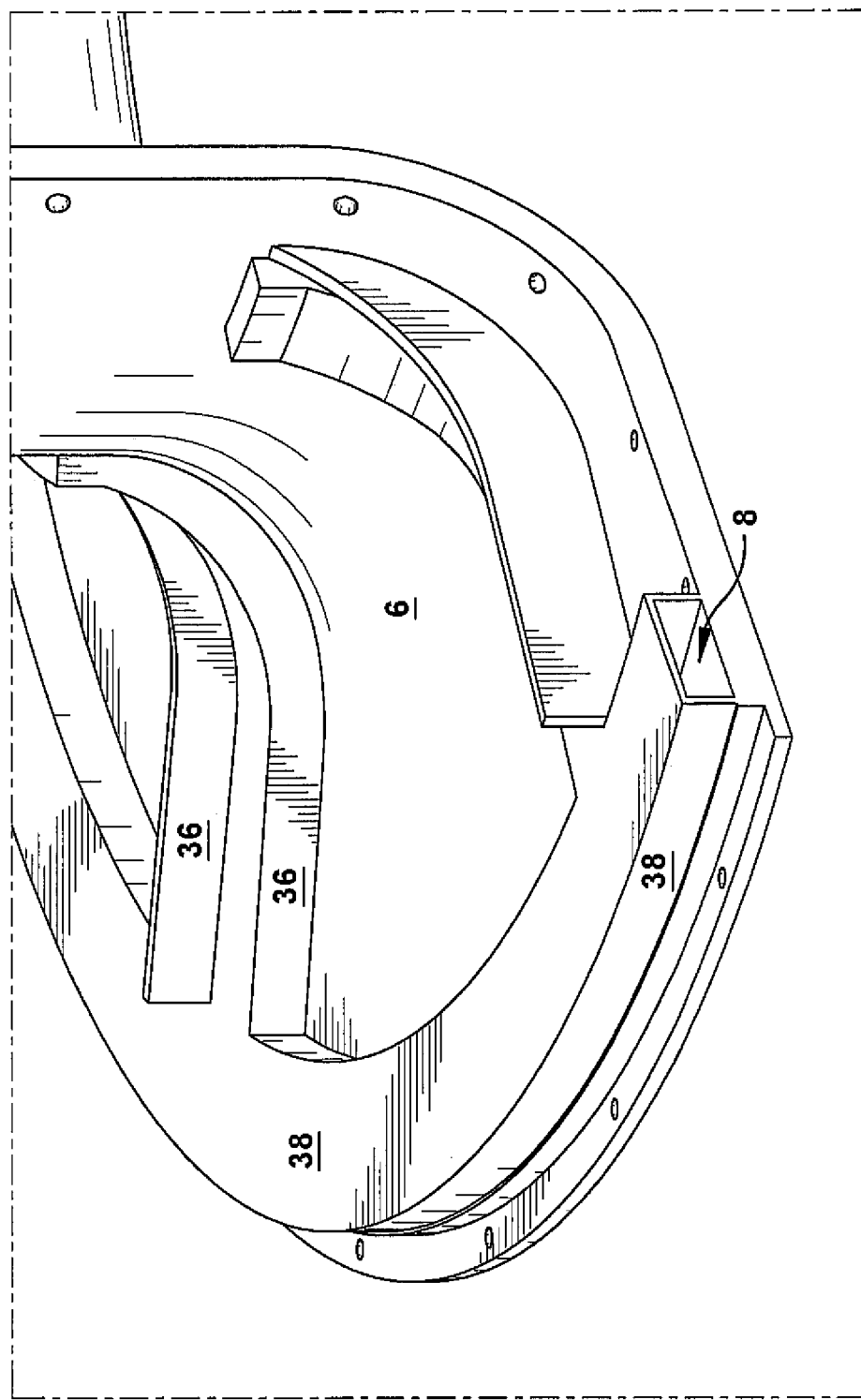
FIG. 4 shows a three-dimensional partial perspective view of a dynamoelectric machine pressurizing apparatus according to embodiments of the invention.

Turning to FIG. 4, a three-dimensional perspective view of the air shield 6 is shown according to embodiments of the invention. This perspective view illustrates an axially inward facing portion of air shield 6, such that openings 15 (FIG. 2) are not visible from this perspective. As shown, in one embodiment, air shield 6 may include one or more protrusions 36, which may form or house portions (e.g., a first portion) of the channel 8. In one embodiment, these protrusions 36 are formed separately from the air shield 6 and later glued, molded or otherwise affixed to the air shield. In another embodiment, these protrusions 36 may be integrally formed (e.g., cast) with the air shield 6. In either case, these protrusions 36 may form sections (e.g., a first section) of the channel 8, and in particular, may be fluidly connected with the opening(s) 15 located proximate the outlet of rotor fan 10. Also shown in FIG. 4 is a manifold 38, which may be fluidly connected with the channel 8 (and protrusions 36 forming channel 8). Manifold 38 may be configured to extend circumferentially about an axis of the rotor (e.g., rotor shaft 26, FIG. 2). In any case, manifold 38 may act as an inlet for ambient air from the ambient air source 12 (FIG. 1), and may act as a conduit for that ambient air to flow into one or more openings 15 in the air shield 6 (via channel 8). It is understood that protrusions 36 and manifold 38 may take any form capable of acting as a conduit for air. For example, the channel 8 (including protrusion(s) 36 and manifold(s) 38) may be formed from piping in some embodiments. It is further understood that as described herein, portions of the channel 8 may be substantially defined by the protrusion 36 and the manifold 38, respectively. For example, the first portion of the channel extending along the arcuate portion 14 (FIGS. 1-2) of the air shield 6 may be defined by protrusion 36, while the second portion of the channel extending along the substantially planar portion 18 (FIGS. 1-2) of air shield 6 may be defined by the manifold 38.

Figure 5:
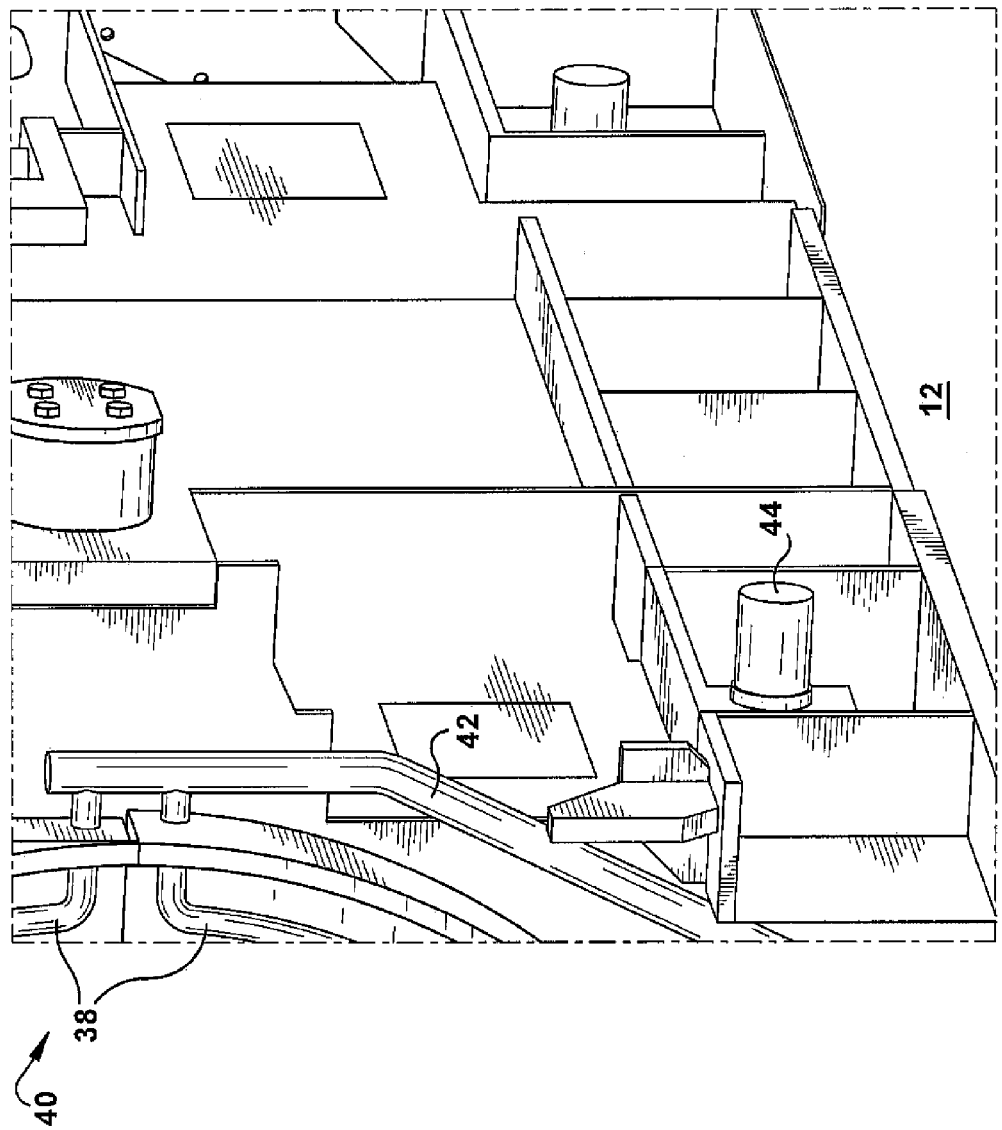
FIG. 5 shows a three-dimensional partial perspective view of a dynamoelectric machine stator casing according to embodiments of the invention.

Turning to FIG. 5, a three-dimensional partial perspective view of stator wall, or casing, 40 (e.g., of stator 24, in FIG. 1) is shown according to embodiments of the invention. In this illustration, one embodiment of the manifold 38 is illustrated within stator wall as a pipe (where two manifolds 38 are shown). Also shown in this perspective view is an inlet pipe 42 fluidly connected with the manifold(s) 38. In one embodiment, inlet pipe 42 may include a valve (e.g., a three-way valve) fluidly connected to the channel (and the manifold(s) 38), where the valve is configured to modify an amount of air admitted to the outlet of the rotor fan 10 (via the opening 15, FIG. 2) from the ambient air source 12 (e.g., outside air). Also shown in FIG. 5 is an inlet air filter 44 which may be operably connected to the valve and fluidly connected to the channel(s) (e.g., channel 8, FIGS. 1, 3) via the manifold(s) 38. In some embodiments, the air filter 44 is configured to modify the amount of air admitted to the outlet of the rotor fan 10 in response to actuation of the valve (e.g., wherein actuation is initiated by a control system or human operator). That is, the valve may allow for partial to full opening/closing of the air filter 44 to permit or restrict flow of air from the ambient air source 12 to the opening 15 (FIGS. 1-2) proximate rotor fan 10.

Figure 6:
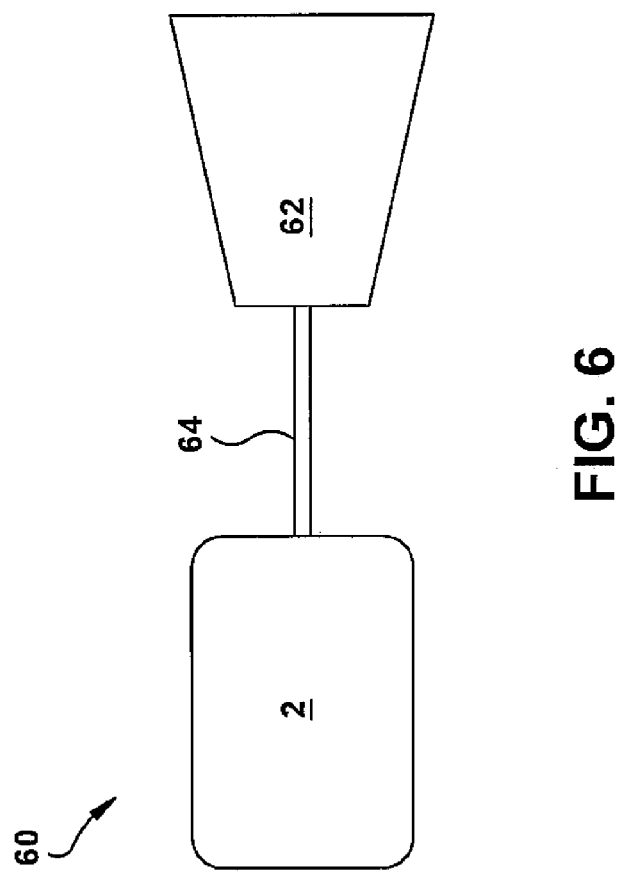
FIG. 6 shows a schematic view of components included in a system according to an embodiment of the invention.

FIG. 6 shows components included in a system (e.g., a power generation system) 60 including a dynamoelectric machine 2 according to an embodiment of the invention. As shown, system 60 may include the dynamoelectric machine 2 (including components such as the dynamoelectric machine pressurizing apparatus 4 described herein), a turbine 62, and a shaft 64 operably coupling turbine 62 and dynamoelectric machine 2. Turbine 62 may be any conventional steam or gas turbine. Further, turbine 62 may represent a plurality of turbine systems, such as multiple steam turbine sections including one or more of a high pressure section, intermediate pressure section and low pressure section. Other components included in conventional turbine systems (e.g., condensers, heat recovery steam generator sections, etc.) have been omitted for clarity. In one embodiment, where dynamoelectric machine 2 includes an electric generator, turbine 62 may generate rotational motion via the flow of steam or hot gas across turbine blades (not shown). This rotational motion may be transferred to dynamoelectric machine 2 via shaft 64, which may in turn transfer the rotational motion to rotor shaft 26 (FIG. 2). Rotation of rotor shaft 26 inside dynamoelectric machine 2 may, e.g., generate electricity for use in homes, business, etc. It is also understood that rotational motion from dynamoelectric machine 2 may be transferred to turbine 62 via shaft 64, for example, during start-up of turbine 62.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
    a dynamoelectric machine air shield for an air-cooled dynamoelectric machine, the dynamoelectric air shield including:
        a channel configured to fluidly connect an outlet of a rotor fan with an ambient air source,
        the rotor fan including a set of fan blades; and
        an arcuate portion axially outward of the set of fan blades, wherein the channel includes an opening along the arcuate portion that is axially outward of the set of fan blades; and
    an air foil cover extending axially over a portion of the opening.

2. The apparatus of claim 1, wherein the channel includes a first section extending along the arcuate portion of the dynamoelectric machine air shield.

3. The apparatus of claim 2, wherein the channel further includes a second section fluidly connected to the first section, the second section being configured to fluidly connect to the ambient air source.

4. The apparatus of claim 3, wherein the dynamoelectric machine air shield further includes a substantially planar portion extending from the arcuate portion, and wherein the second section of the channel extends along the substantially planar portion.

5. The apparatus of claim 4, wherein the second section of the channel is a manifold configured to extend circumferentially about a rotor shaft.

6. An air-cooled dynamoelectric machine comprising:
    a casing substantially containing:
        a rotor including a rotor fan;
        a stator substantially surrounding the rotor and the rotor fan, wherein the rotor and the stator are substantially sealed from an ambient air source by the casing; and
        an air shield at least partially surrounding the rotor, the air shield including:

a channel configured to fluidly connect an outlet of the rotor fan with the ambient air source, the rotor fan including a set of fan blades; and an arcuate portion axially outward of the set of fan blades, wherein the channel includes an opening along the arcuate portion that is axially outward of the set of fan blades; and an air foil cover extending axially over a portion of the opening.

7. The dynamoelectric machine of claim 6, wherein the channel includes a first section extending along the arcuate portion of the air shield.

8. The dynamoelectric machine of claim 7, wherein the channel further includes a second section fluidly connected to the first section, the second section being configured to fluidly connect to the ambient air source.

9. The dynamoelectric machine of claim 8, wherein the air shield further includes a substantially planar portion extending from the arcuate portion, and wherein the second section of the channel extends along the substantially planar portion.

10. The dynamoelectric machine of claim 9, wherein the second section of the channel is a manifold configured to extend circumferentially about an axis of the rotor.

11. A system comprising:

a turbine;

an air-cooled dynamoelectric machine operably coupled to the turbine, the dynamoelectric machine comprising:

a casing substantially containing:

a rotor including a rotor fan;

a stator substantially surrounding the rotor and the rotor fan, wherein the rotor and the stator are substantially sealed from an ambient air source by the casing; and an air shield at least partially surrounding the rotor, the air shield including:

a channel configured to fluidly connect an outlet of the rotor fan with the ambient air source, the rotor fan including a set of fan blades; and an arcuate portion axially outward of the set of fan blades, wherein the channel includes an opening along the arcuate portion that is axially outward of the set of fan blades; and an air foil cover extending axially over a portion of the opening.

12. The system of claim 11, wherein the channel includes a first section extending along the arcuate portion of the air shield.

13. The system of claim 12, wherein the channel further includes a second section fluidly connected to the first section, the second section being configured to fluidly connect to the ambient air source.

* * * * *